United States Patent
Zell et al.

(10) Patent No.: US 10,507,814 B2
(45) Date of Patent: Dec. 17, 2019

(54) HYDRAULIC FAILURE ISOLATION VALVE

(71) Applicant: GOODRICH CORPORATION, Charlotte, NC (US)

(72) Inventors: Brian Keith Zell, Dayton, OH (US); Marc Georgin, Dayton, OH (US); Paul R. Burte, Clayton, OH (US); Gregory Hickey, Bellbrook, OH (US); Efrem E. Ayichew, Troy, OH (US); Clifton R. Boggs, Springfield, OH (US); Eric Meraz, Dayton, OH (US); Brian Ralph, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 112 days.

(21) Appl. No.: 15/852,863

(22) Filed: Dec. 22, 2017

(65) Prior Publication Data

US 2019/0193704 A1  Jun. 27, 2019

(51) Int. Cl.
| | | |
|---|---|---|
| *B60T 13/14* | (2006.01) | |
| *B60T 13/58* | (2006.01) | |
| *F15B 20/00* | (2006.01) | |
| *F16K 15/02* | (2006.01) | |
| *F15B 13/02* | (2006.01) | |
| *B64C 25/42* | (2006.01) | |
| *F15B 1/04* | (2006.01) | |
| *F15B 11/08* | (2006.01) | |

(52) U.S. Cl.
CPC ............ *B60T 13/148* (2013.01); *B60T 13/58* (2013.01); *F15B 20/008* (2013.01); *F16K 15/026* (2013.01); *B64C 25/42* (2013.01); *F15B 1/04* (2013.01); *F15B 11/08* (2013.01); *F15B 13/027* (2013.01)

(58) Field of Classification Search
CPC ...... B60T 13/148; B60T 13/58; F15B 20/008; F15B 1/04; F15B 11/08; F15B 13/027; F16K 1/026
See application file for complete search history.

(56) References Cited

U.S. PATENT DOCUMENTS

| | | |
|---|---|---|
| 3,874,172 A | 4/1975 | Masuda |
| 7,059,460 B2 | 6/2006 | Duan et al. |
| 2004/0239173 A1 | 12/2004 | Williams et al. |
| 2016/0016576 A1* | 1/2016 | Howell ............... B60T 8/1703 701/3 |

FOREIGN PATENT DOCUMENTS

| | | |
|---|---|---|
| DE | 19953001 | 5/2001 |
| GB | 2470251 | 11/2010 |
| WO | 2012051099 | 4/2012 |

OTHER PUBLICATIONS

European Patent Office, European Search Report dated Mar. 26, 2019 in Application No. 18214147.3.

* cited by examiner

*Primary Examiner* — Melanie Torres Williams
(74) *Attorney, Agent, or Firm* — Snell & Wilmer, L.L.P.

(57) ABSTRACT

Braking control systems, such as for an aircraft, use a hydraulic failure isolation valve intermediate an accumulator power source and a dual valve assembly for mechanical operation when a hydraulic power source experiences a disruption.

16 Claims, 5 Drawing Sheets

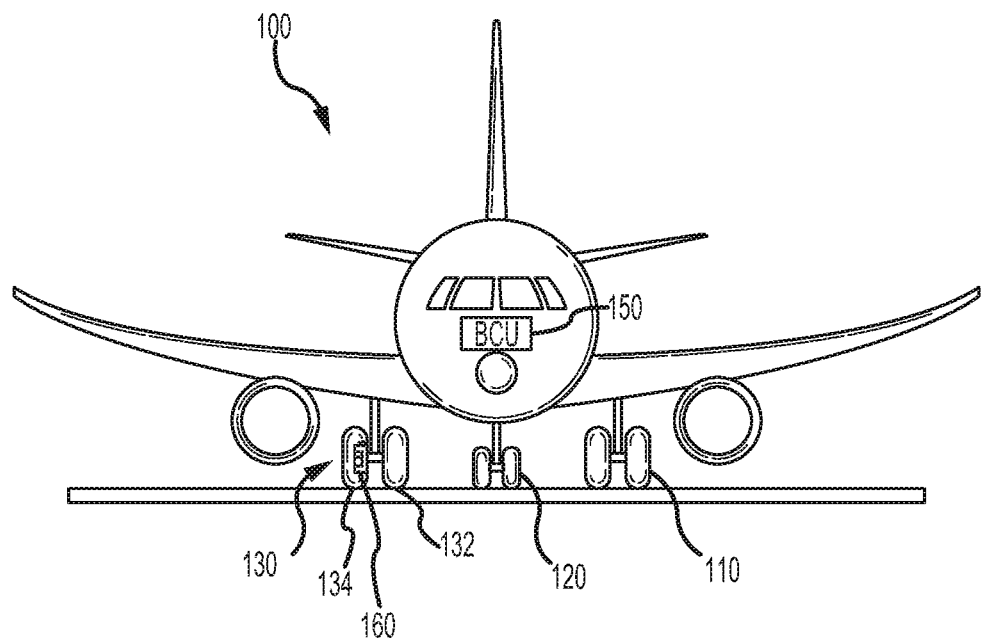
FIG. 1-A

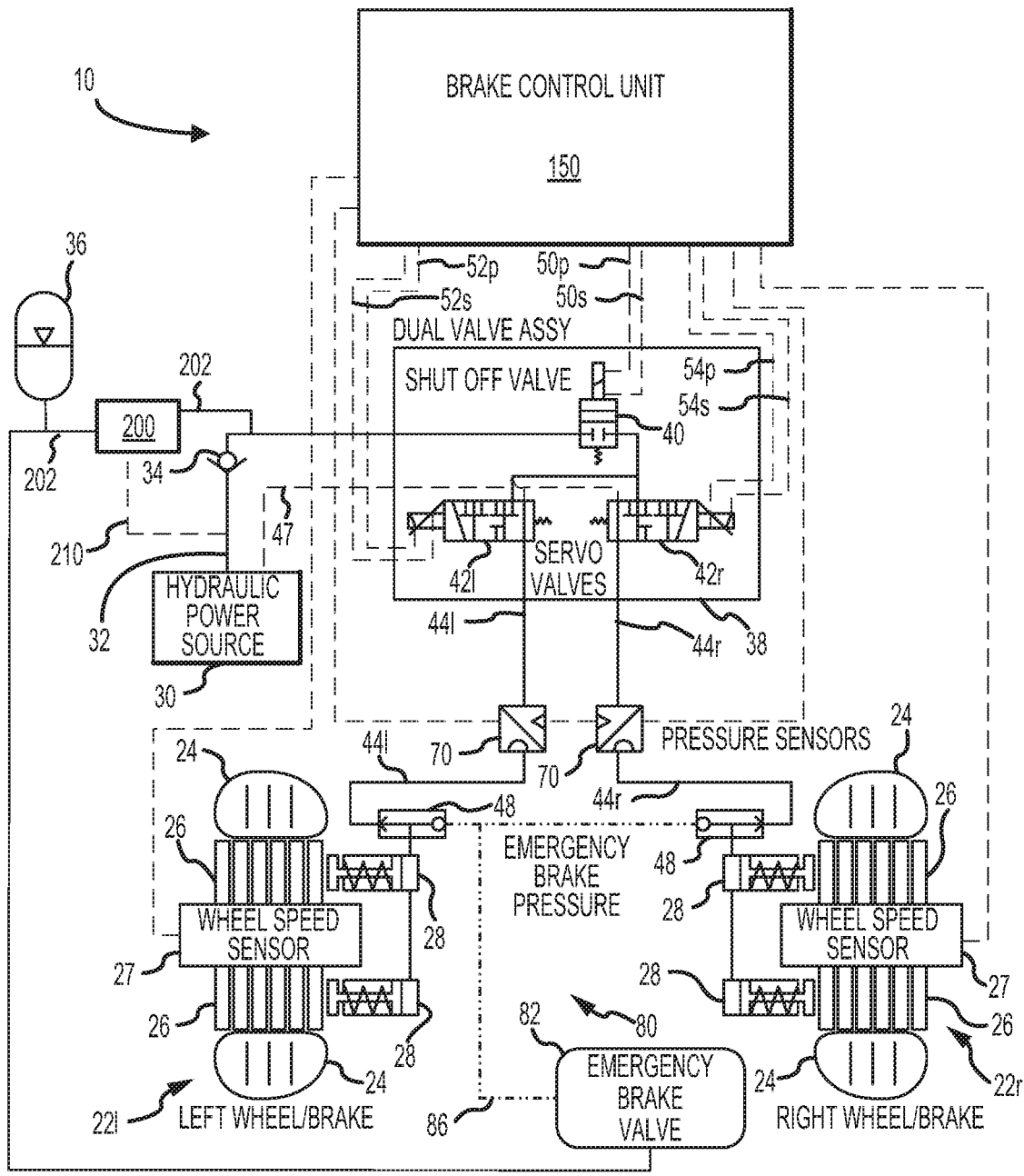
FIG. 1-B

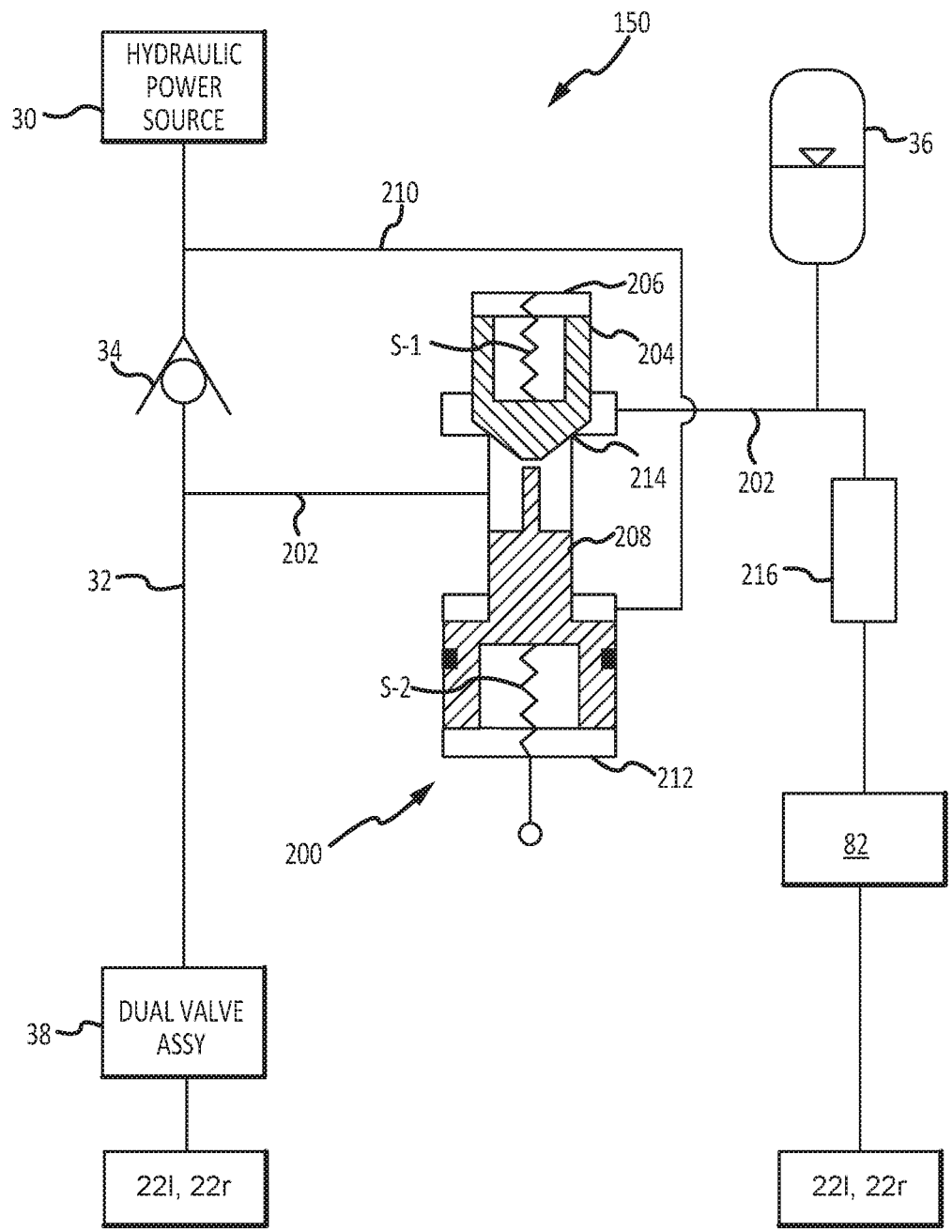
FIG. 2-A

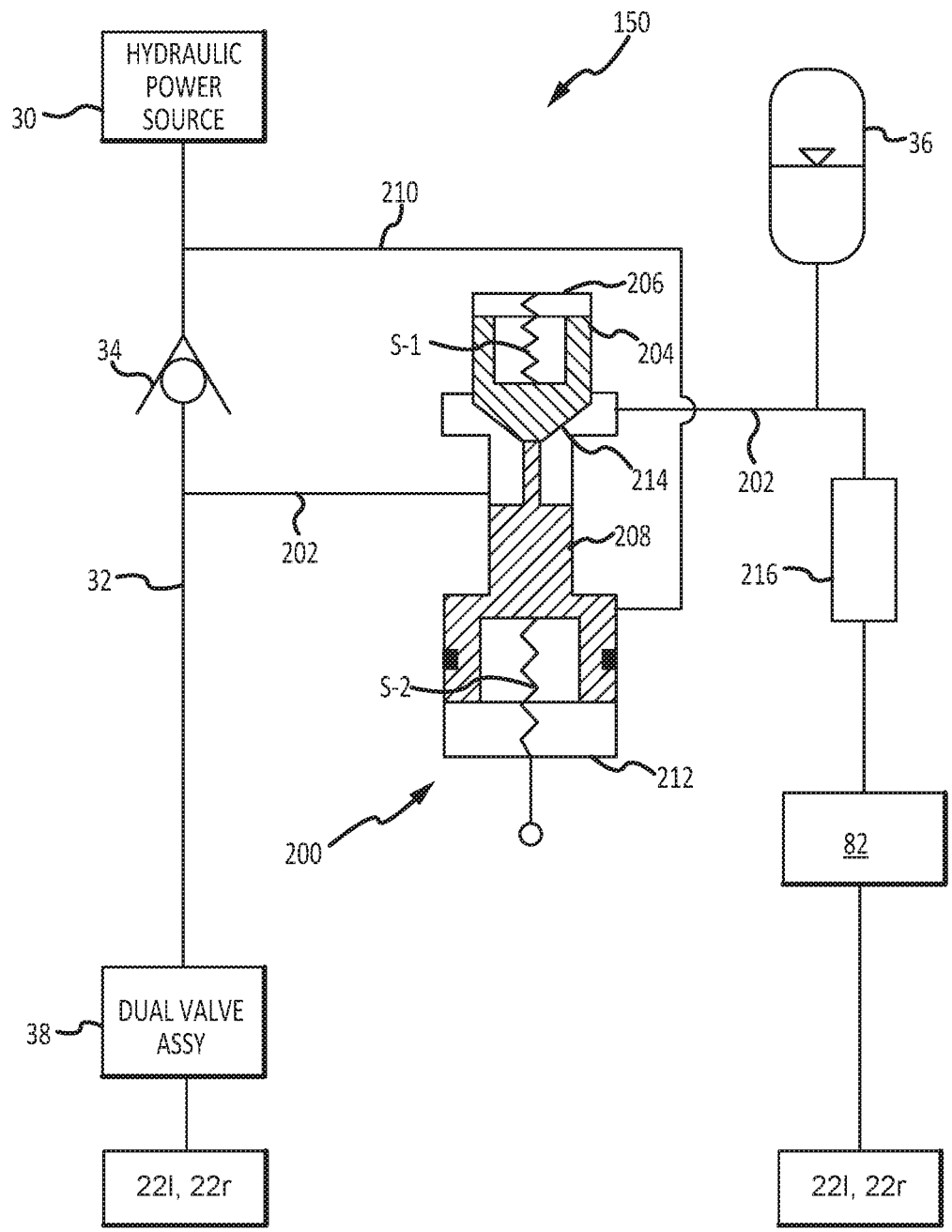
FIG. 2-B

HYDRAULIC FAILURE ISOLATION VALVE

FIELD

In general, the arrangements disclosed herein relate to brake systems, and, more specifically, to improvements for brake systems suitable for use in aircraft.

BACKGROUND

For backup and safety purpose, many aircraft include redundant parts and systems. This way, if one part or system fails, another part or system performs as a backup, thereby ensuring safe operation of the aircraft. As a result, parts designed to contain and/or isolate failures increase the safety of flying and landing, particularly advantageously for many modern braking systems.

SUMMARY

In various embodiments, a brake control system for maintaining hydraulic pressure includes a hydraulic power source configured for fluid communication with a dual valve assembly through a main hydraulic line; an accumulator power source configured for fluid communication with the dual valve assembly through an accumulator hydraulic line; and a hydraulic failure isolation valve comprising a check valve operative between a first position and a second position, the hydraulic failure isolation valve positioned along the accumulator hydraulic line and configured for operation in the event of a disruption between the hydraulic power source and the dual valve assembly, wherein the first position is configured to maintain fluid communication along the main hydraulic line and the second position is configured to maintain fluid communication along the accumulator hydraulic line through the check valve of the hydraulic failure isolation valve.

In various embodiments: the accumulator power source is configured to back up to the hydraulic power source; and/or the check valve is configured in the first position when the hydraulic power source is in communication with the dual valve assembly and the check valve is configured in the second position when the accumulator power source is in communication with the dual valve assembly; and/or the check valve is configured to move from the first position to the second position in the event of the disruption; and/or the check valve is configured to be held in the first position and the second position by respective spring forces within the hydraulic failure isolation valve; and/or the check valve is configured to move from the first position to the second position if the disruption is communicated from the main hydraulic line to the hydraulic failure isolation valve along a sensing line in communication between the main hydraulic line and the hydraulic failure isolation valve; and/or the check valve is configured to maintain fluid communication between the hydraulic power source and the dual valve assembly or between the accumulator power source and the dual valve assembly at any one time; and/or the hydraulic failure isolation valve is configured to provide pressurized fluid to a brake actuator to actuate a braking force; and/or the brake actuator is configured to operate in response to one or more system inputs representing one or more brake commands acting through a brake control unit; and/or the brake actuator is configured to actuate the braking force on a wheel of an aircraft; and/or the check valve is configured to physically block the hydraulic pressure between the accumulator power source and the dual valve assembly when in the first position; and/or the check valve is configured to physically allow the hydraulic pressure between the accumulator power source and the dual valve assembly when in the second position.

In various embodiments, a hydraulic failure isolation valve includes a check valve operable between a first position to maintain hydraulic pressure between a hydraulic power source and a dual valve assembly along a main hydraulic line and a second position to maintain hydraulic pressure between an accumulator power source and the dual valve assembly along an accumulator hydraulic line; and a sensing line operative between the main hydraulic line and the hydraulic failure isolation valve, configured to move the check valve between the first position and the second position in the event of a disruption between the hydraulic power source and the dual valve assembly.

In various embodiments: the brake actuator is configured to operate in response to one or more system inputs representing one or more brake commands acting through a brake control unit; and/or the brake actuator is configured to actuate the braking force on a wheel of an aircraft; and/or the check valve is configured to physically block the hydraulic pressure between the accumulator power source and the dual valve assembly when in the first position; and/or the check valve is configured to physically allow the hydraulic pressure between the accumulator power source and the dual valve assembly when in the second position.

In various embodiments, a method of maintaining hydraulic pressure in a brake control system includes maintaining hydraulic pressure between a hydraulic power source and a dual valve assembly through a main hydraulic line; maintaining hydraulic pressure between an accumulator power source and the dual valve assembly through an accumulator hydraulic line; and engaging a hydraulic failure isolation valve along the accumulator hydraulic line in the event of a disruption to the hydraulic power source to provide the hydraulic pressure between the accumulator power source and the dual valve assembly.

In various embodiments: methods maintain the hydraulic pressure between the hydraulic power source and the dual valve assembly or between the accumulator power source and the dual valve assembly via a check valve within the hydraulic failure isolation valve; and/or spring forces acting on the check valve maintain the hydraulic pressure between the hydraulic power source and the dual valve assembly or between the accumulator power source and the dual valve assembly.

BRIEF DESCRIPTION OF THE DRAWINGS

The accompanying drawings illustrate various embodiments employing the principles described herein and are a part of the specification. The illustrated embodiments are meant for description only, and they do not limit the scope of the claims, and in which:

FIG. 1-A illustrates an aircraft having multiple landing gear and brakes, in various embodiments;

FIG. 1-B illustrates a functional diagram of a braking system having a hydraulic power source and an accumulator power source as a back-up thereto, in various embodiments;

FIG. 2-A illustrates a hydraulic failure isolation valve in a first position, suitable for use in a braking system, such as those in FIG. 1-A and FIG. 1-B, in various embodiments;

FIG. 2-B illustrates a hydraulic failure isolation valve in a second position, suitable for use in a braking system, such as those in FIG. 1-A and FIG. 1-B, in various embodiments.

DETAILED DESCRIPTION

Figure 3:
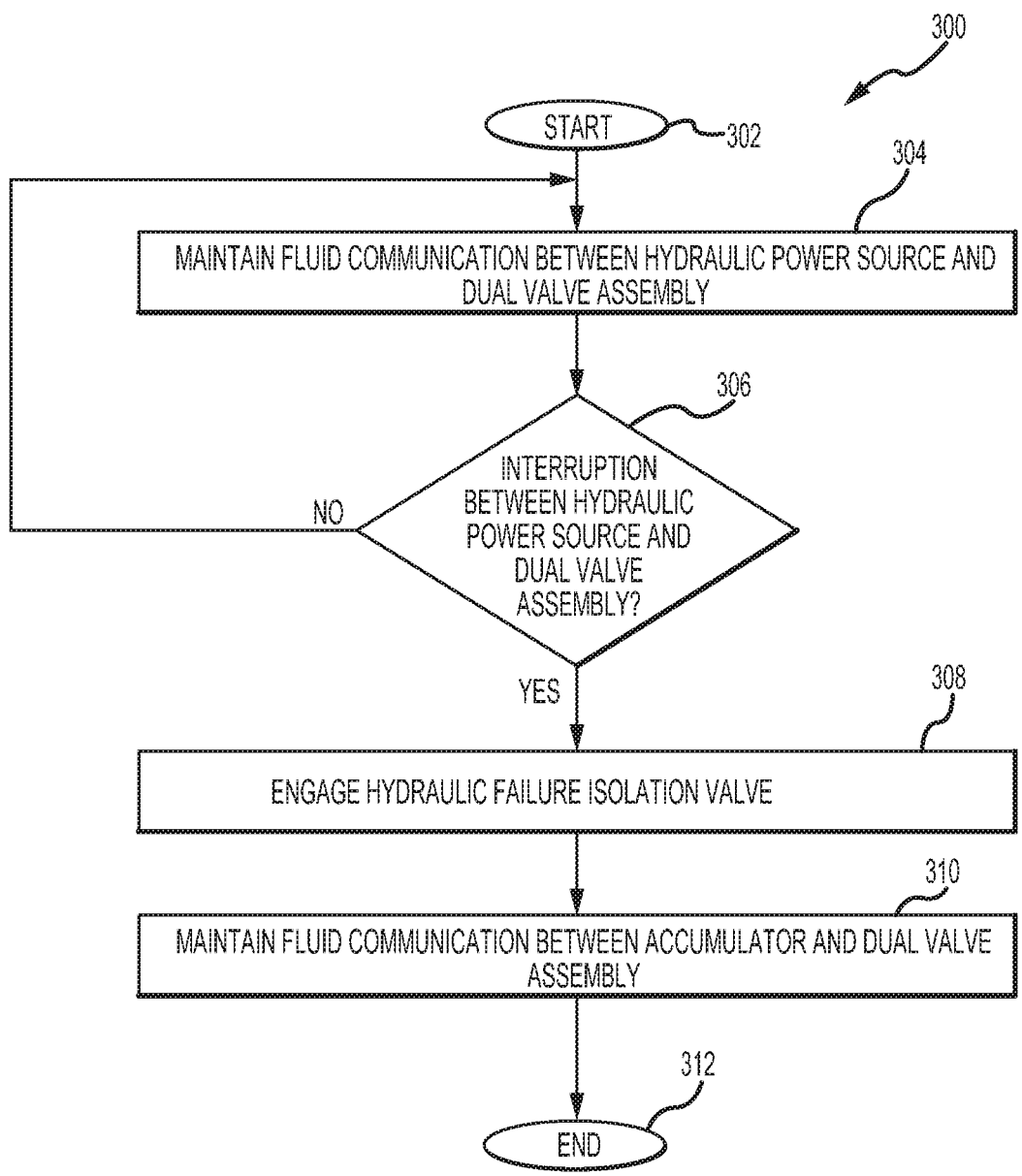
FIG. 3 is a flowchart of a method of utilizing a hydraulic failure isolation valve, such as those in FIGS. 2-A and 2-B, in various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, is a hydraulic failure isolation valve, such as from within a braking system architecture of an aircraft. While numerous details are included herein pertaining to aircraft components, such as brake components, the systems disclosed herein can be applied to other systems with other hydraulic valves and the like.

Referring now to FIG. 1-A, a representative aircraft 100 includes multiple landing gear systems, including a first landing gear 110, second landing gear 120, and third landing gear 130. Typically, each landing gear includes one or more wheel assemblies. For example, the third landing gear 130 includes an inner wheel assembly 132 and outer wheel assembly 134. Ideally, the first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and/or one or more of the first landing gear 110, second landing gear 120, and third landing gear 130 are operationally retractable into the aircraft 100 when the aircraft 100 is in flight and/or airborne.

In various embodiments, the aircraft 100 further includes a brake control unit (BCU) 150. In various embodiments, the BCU 150 controls, at least various parts of, the braking of the aircraft 100. For example, in various embodiments, the BCU 150 controls various parameters of braking, such as manual brake control, automatic brake control, antiskid braking, locked wheel protection, touchdown protection, park capability, gear retraction braking, and the like.

Referring still to FIG. 1-A, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command from the BCU 150. In various embodiments, each of the wheel assemblies, such as the outer wheel assembly 134 of the third landing gear 130 of the aircraft 100, comprises any number of wheels.

Referring now to FIG. 1-B, including with continued reference to FIG. 1-A as well, a closed-loop braking system 10 is shown in accordance with an embodiment of the inventive arrangements. The braking system 10 includes the braking control unit (BCU) 150 of FIG. 1-A. In various embodiments, the braking system 10 enables braking the aircraft 100. However, it will be appreciated that the braking system 10 may also be used in connection with other types of vehicles without departing from the scope of the inventive arrangements.

In various embodiments, the BCU 150 controls braking of a left wheel/brake assembly 22l and a right wheel/brake assembly 22r. The left wheel/brake assembly 22l includes one or more wheels 24 and brake stacks 26. A plurality of actuators 28 are provided for exerting a brake force on the brake stacks 26 in order to brake the wheels 24. The right wheel/brake assembly 22r has a similar, mirrored configuration. Both the left wheel/brake assembly 22l and right wheel brake assembly 22r include a respective wheel speed sensor 27 that provides wheel speed information to the BCU 150 for carrying out brake control operations. It will be appreciated that while various embodiments are described with respect to two wheels 24, various embodiments also apply to any number of wheels 24 of the aircraft 100.

A hydraulic power source 30 serves as a main brake power supply within the braking system 10. A main hydraulic line 32 from the hydraulic power source 30 includes a check valve 34. The main hydraulic line 32 is input into a dual valve assembly 38 included within the braking system 10. The dual valve assembly 38 includes a shutoff valve 40 through which the main hydraulic line 32 supplies hydraulic fluid to left and right wheel servo valves 42l and 42r, respectively. Fluid from the left and right wheel servo valves 42l and 42r is provided through left and right hydraulic lines 44l and 44r, respectively, to apply the braking force to the wheels 24 during a braking operation. A return line 47 is provided from the left and right wheel servo valves 42l and 42r back to the hydraulic power source 30.

During operation of various embodiments, fluid pressure through the left and right hydraulic lines 44l and 44r passes to the corresponding actuators 28 via one or more corresponding directional valves 48. Thus, if the braking system 10 is functioning in various embodiments, the shutoff valve 40 is open during braking and the BCU 150 controls the amount of hydraulic pressure that is delivered to each of the wheels 24 via the corresponding left and right wheel servo valves 42l and 42r.

In various embodiments, the shutoff valve 40 and the left and right wheel servo valves 42l and 42r are each dual control coil valves, and the BCU 150 includes a primary control channel and secondary control channel. The shutoff valve 40 receives a shutoff valve control signal on a dedicated line 50p from the primary channel and a shutoff valve control signal on a line 50s from the secondary channel. Similarly, the left wheel servo valve 42l receives a servo valve control signal on a line 52p from the primary channel and a servo valve control signal on a line 52s from the secondary channel. Likewise, the right wheel servo valve 42r receives a servo valve control signal on a line 54p from the primary channel and a servo valve control signal on a line 54s from the secondary channel. Because the left and right wheel servo valves 42l and 42r are each dual control coil valves, each valve can be controlled by both the primary and secondary channels of the BCU 150. Such redundancy allows full brake operation to continue even if one of the channels should fail.

As further represented in FIG. 1-B, the braking system 10 further includes pressure sensors 70 for monitoring the hydraulic pressure in the left and right hydraulic lines 44l and 44r and providing such information back to the BCU 150. In various embodiments, power is transmitted to the BCU 150 via separate and independent power buses (not shown)—that is, power to the primary and secondary channels is provided to the BCU 150 via respective power buses.

Thus, a loss of power in relation to one channel does not disable the other channel, for example.

In various embodiments, the braking system 10 also includes an emergency brake system 80 as an additional level of redundancy. The emergency brake system 80 is an independent braking source that can be used in the event of a failure within the braking system 10. The emergency brake system 80 includes an emergency brake valve 82 that communicates with the actuators 28 via a hydraulic line 86 and the directional valves 48.

The braking system 10 provides a high level of reliability and availability. This is achieved through the use of redundant components throughout numerous parts of the braking system 10. As noted above, the central component of the braking system is the BCU 150, which contains two redundant brake control channels identified as primary and secondary. Each of these channels is capable of performing full brake control independently of the other, and they are preferably physically and electrically isolated from each other within the BCU 150.

The hydraulic portion of the braking system 10 utilizes the shutoff valve 40 in-line with the left wheel servo valve 42l and right wheel servo valve 42r to provide a level of redundancy that ensures a single valve failure cannot cause inadvertent braking. In order for the braking force to be applied by the braking system 10 to the left wheel/brake assembly 22l and right wheel brake assembly 22r, the shutoff valve 40 must be open along with at least one of the two left and right wheel servo valves 42l and 42r. To provide a redundancy so that the brakes can be operated when commanded, each of the valves (shutoff and servo) contain dual control coils with one coil for each channel in the BCU 150, as described above.

Referring now also to FIGS. 2-A and 2-B, the braking system 10 further includes a hydraulic failure isolation valve 200, as will be elaborated upon. In various embodiments, the hydraulic power source 30 is in fluid communication with the dual valve assembly 38 through the main hydraulic line 32, including with the check valve 34 operative between the hydraulic power source 30 and the dual valve assembly 38. The check valve 34 is a one-way valve, allowing hydraulic fluid from the hydraulic power source 30 to communicate with and control the dual valve assembly 38 of the braking system 10. In the event of a loss of hydraulic pressure from the hydraulic power source 30, the check valve 34 ensures direction flow only continues towards the dual valve assembly 38 and not towards the hydraulic power source 30. However, in the event of such an disruption, the accumulator 36 now maintains fluid communication with the dual valve assembly 38 through an accumulator hydraulic line 202 operative in conjunction with the hydraulic failure isolation valve 200, as will be elaborated upon.

In primary operation between the hydraulic power source 30 and the dual valve assembly 38, hydraulic flow from the accumulator 36 is physically prevented from communicating with the dual valve assembly 38 by way of a check valve 204 within the hydraulic failure isolation valve 200. The check valve 204 is maintained in a first position (as shown in FIG. 2-A) within the hydraulic failure isolation valve 200 by a first spring S-1 at a first end 206 of the hydraulic failure isolation valve 200. A piston 208 within the hydraulic failure isolation valve 200 remains clear of the check valve 204 due to pressure in the main hydraulic line 32, as communicated to the hydraulic failure isolation valve 200 by a sensing line 210 in communication between the main hydraulic line 32 and the hydraulic failure isolation valve 200. In various embodiments, the hydraulic pressure of the sensing line 210 overcomes the force of a second spring S-2 at a second end 212 of the hydraulic failure isolation valve 200, the second end 212 being spaced apart from the first end 206.

In the event of a disruption in the main hydraulic line 32, as communicated to the hydraulic failure isolation valve 200 via the sensing line 210, the force of the second spring S-2 at the second end 212 of the hydraulic failure isolation valve 200 overcomes the force of the first spring S-1 at the first end 206 and the sensing line 210, thereby forcing a poppet 214 of the check valve 204 towards the first end 206 and opening the accumulator hydraulic line 202 to be able to flow through the hydraulic failure isolation valve 200. When the check valve 204 is maintained in this second position (as shown in FIG. 2-B) within the hydraulic failure isolation valve 200 by the second spring S-2, hydraulic flow from the accumulator 36 communicates with the dual valve assembly 38 through the accumulator hydraulic line 202 and hydraulic failure isolation valve 200.

In this fashion, the accumulator 36 backs-up the hydraulic power source 30 through the hydraulic failure isolation valve 200, in various embodiments.

In various embodiments, a fuse 216 is located downstream of the accumulator 36 to prevent hydraulic fluid from the accumulator 36 from reaching the emergency brake valve 82 of the braking system 10 if the accumulator hydraulic line 202 is damaged.

In various embodiments, again as shown in FIG. 2-B, the piston 208 within the check valve 204 has moved the check valve 204 from its first position (as shown in FIG. 2-A) to its second position as a result of the sensing line 210 and second spring S-2, the second position now physically allowing hydraulic fluid from the accumulator 36 to be supplied to the dual valve assembly 38 through the hydraulic failure isolation valve 200.

Referring now to FIG. 3, in various embodiments, a method 300 of maintaining hydraulic pressure in a brake control system begins at a step 302, after which fluid communication is maintained between a hydraulic power source and a dual valve assembly in a step 304. Thereafter, if an interruption is not detected between the hydraulic power source and the dual valve assembly in a step 306, then the fluid communication is maintained between the hydraulic power source and the dual valve assembly according to the step 304. In various embodiments, if an interruption is detected between the hydraulic power source and the dual valve assembly at the step 306, then a hydraulic failure isolation valve is engaged at a step 308. Thereafter, fluid communication is maintained between an accumulator and the dual valve assembly via the hydraulic failure isolation valve at a step 310, after which the method 300 ends at a step 312.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A brake control system for maintaining hydraulic pressure, comprising:
    a hydraulic power source configured for fluid communication with a dual valve assembly through a main hydraulic line;
    an accumulator power source configured for fluid communication with the dual valve assembly through an accumulator hydraulic line; and
    a hydraulic failure isolation valve comprising:
        a first spring at a first end of the hydraulic failure isolation valve;
        a second spring at a second end of the hydraulic failure isolation valve, the second end being space apart from the first end;
        a check valve coupled to the first spring, the check valve maintained in a check valve first position by the first spring, the check valve being operative between the check valve first position and a check valve second position, the hydraulic failure isolation valve positioned along the accumulator hydraulic line and configured for operation in the event of a disruption between the hydraulic power source and the dual valve assembly, wherein the check valve first position is configured to maintain fluid communication along the main hydraulic line and the check valve second position is configured to maintain fluid communication along the accumulator hydraulic line through the check valve of the hydraulic failure isolation valve; and
        a piston coupled to the second spring, the piston maintained in a piston first position by the second spring, the piston being operative between the piston first position and a piston second position by a second spring force of the second spring overcoming a first spring force of the first spring.

2. The system of claim 1, wherein the accumulator power source is configured to back up to the hydraulic power source.

3. The system of claim 1, wherein the check valve is configured in the check valve first position when the hydraulic power source is in communication with the dual valve assembly and the check valve is configured in the check valve second position when the accumulator power source is in communication with the dual valve assembly.

4. The system of claim 1, wherein the check valve is configured to move from the check valve first position to the check valve second position in the event of the disruption.

5. The system of claim 1, wherein the check valve is configured to move from the check valve first position to the check valve second position if the disruption is communicated from the main hydraulic line to the hydraulic failure isolation valve along a sensing line in communication between the main hydraulic line and the hydraulic failure isolation valve.

6. The system of claim 1, wherein the check valve is configured to maintain fluid communication between the hydraulic power source and the dual valve assembly or between the accumulator power source and the dual valve assembly at any one time.

7. The system of claim 1, wherein the hydraulic failure isolation valve is configured to provide pressurized fluid to a brake actuator to actuate a braking force.

8. The system of claim 7, wherein the brake actuator is configured to operate in response to one or more system inputs representing one or more brake commands acting through a brake control unit.

9. The system of claim 7, wherein the brake actuator is configured to actuate the braking force on a wheel of an aircraft.

10. The system of claim 1, wherein the check valve is configured to physically block the hydraulic pressure between the accumulator power source and the dual valve assembly when in the check valve first position.

11. The system of claim 1, wherein the check valve is configured to physically allow the hydraulic pressure between the accumulator power source and the dual valve assembly when in the check valve second position.

12. A hydraulic failure isolation valve, comprising:
   a first spring at a first end of the hydraulic failure isolation valve;
   a second spring at a second end of the hydraulic failure isolation valve, the second end being spaced apart from the first end;
   a check valve operable between a first position by the first spring to maintain hydraulic pressure between a hydraulic power source and a dual valve assembly along a main hydraulic line and a second position to maintain hydraulic pressure between an accumulator power source and the dual valve assembly along an accumulator hydraulic line;
   a piston operable between the first position by the second spring to remain clear of the check valve and the second position by a second spring force of the second spring overcoming a first spring force of the first spring; and
   a sensing line operative between the main hydraulic line and the hydraulic failure isolation valve, configured to move the check valve between the first position and the second position in the event of a disruption between the hydraulic power source and the dual valve assembly.

13. The hydraulic failure isolation valve of claim 12, wherein the check valve is configured to move from the first position to the second position in the event of the disruption.

14. The hydraulic failure isolation valve of claim 12, wherein the check valve is configured to be held in the first position and the second position by respective spring forces within the hydraulic failure isolation valve.

15. The hydraulic failure isolation valve of claim 12, wherein the check valve is configured to maintain fluid communication between the hydraulic power source and the dual valve assembly or between the accumulator power source and the dual valve assembly at any one time.

16. A method of maintaining hydraulic pressure in a brake control system, comprising:
   maintaining hydraulic pressure between a hydraulic power source and a dual valve assembly through a main hydraulic line;
   maintaining hydraulic pressure between an accumulator power source and the dual valve assembly through an accumulator hydraulic line;
   engaging a hydraulic failure isolation valve along the accumulator hydraulic line in the event of a disruption to the hydraulic power source to provide the hydraulic pressure between the accumulator power source and the dual valve assembly; and
   maintaining the hydraulic pressure between at least one of the hydraulic power source and the dual valve assembly or the accumulator power source and the dual valve assembly via a check valve within the hydraulic failure isolation valve, wherein a first spring force of a first spring acting on the check valve and a second spring force of a second spring acting on a piston maintain the hydraulic pressure between the hydraulic power source and the dual valve assembly or between the accumulator power source and the dual valve assembly.

* * * * *